United States Patent [19]

Lullini et al.

[11] 4,205,711
[45] Jun. 3, 1980

[54] AUTOMATIC FILLING MACHINE WITH COMPRESSED-AIR SEAL

[75] Inventors: Dino Lullini; Giorgio Cesari; Roberto Baruffato, all of Bologna, Italy

[73] Assignee: Mysa S.R.L., Bologna, Italy

[21] Appl. No.: 942,168

[22] Filed: Sep. 14, 1978

[30] Foreign Application Priority Data

Sep. 27, 1977 [IT] Italy ................................. 3561 A/77

[51] Int. Cl.² .............................................. B65B 1/04
[52] U.S. Cl. ........................................ 141/183; 277/3
[58] Field of Search ............ 277/3; 141/129, 130–191, 141/392, 1

[56] References Cited

U.S. PATENT DOCUMENTS

| 4,114,059 | 9/1978 | Albaric et al. | 277/3 |
| 4,118,042 | 10/1978 | Booth | 277/3 |

Primary Examiner—Houston S. Bell, Jr.
Attorney, Agent, or Firm—Karl F. Ross

[57] ABSTRACT

A filling machine for small containers comprises a main hopper which feeds powder to a secondary hopper located above a rotatable dosing head provided with chambers for receiving the powder from the secondary hopper and discharging the powder into individual containers successively displaced below this head. Between the secondary hopper and the rotating head is provided a yieldable intermediate body having a curved surface confronting the curved surface of the head and an opening adapted to communicate between the chamber of the head and the secondary hopper. One of these surfaces is formed with a pair of grooves on each side of the opening and between each pair of grooves with a recess to which compressed air is admitted with the air being discharged through ports in the grooves so that a hermetic seal is provided between the recesses. Pins can space the intermediate body form the head when compressed air is not supplied to the seal.

4 Claims, 4 Drawing Figures

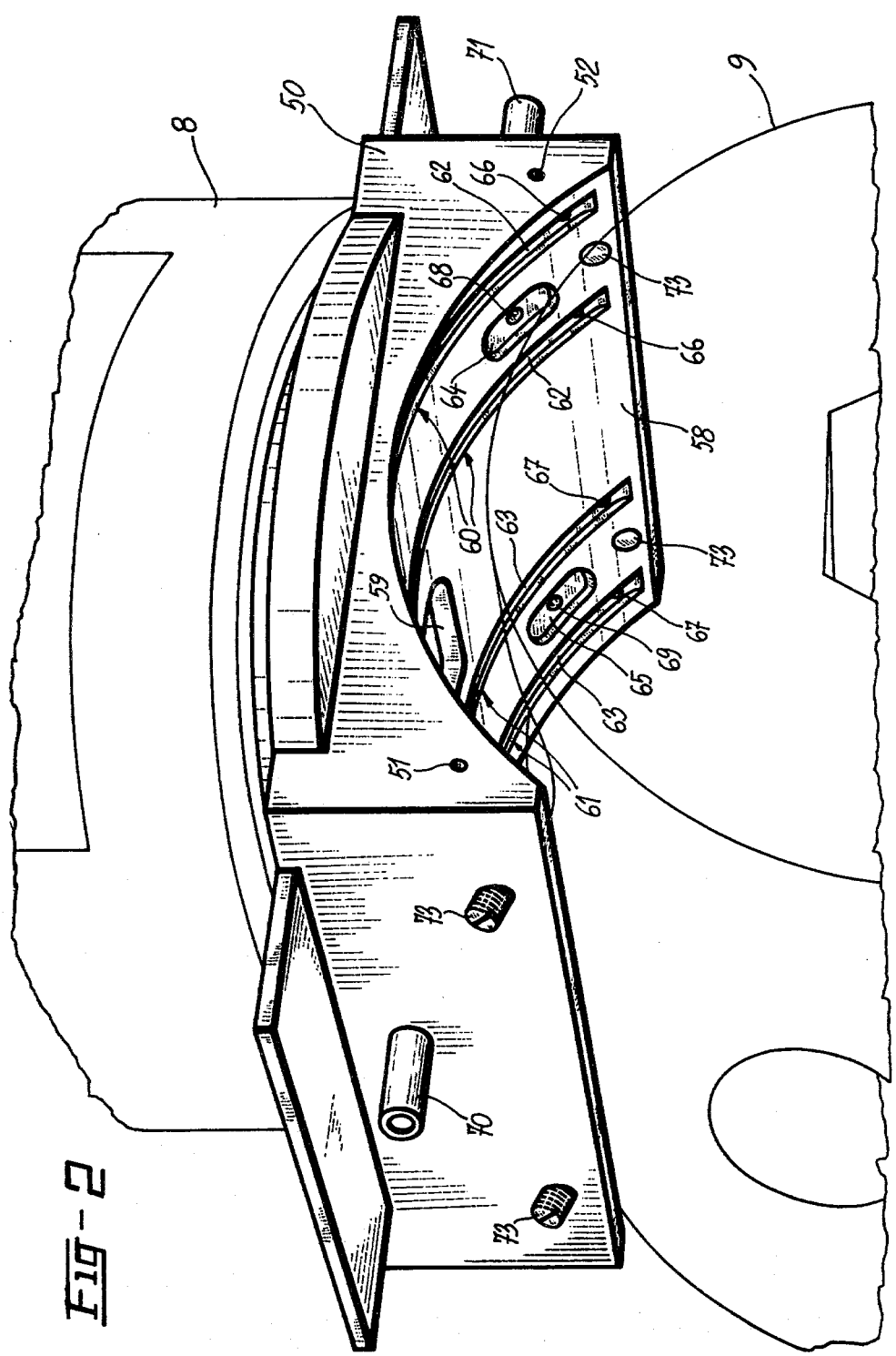

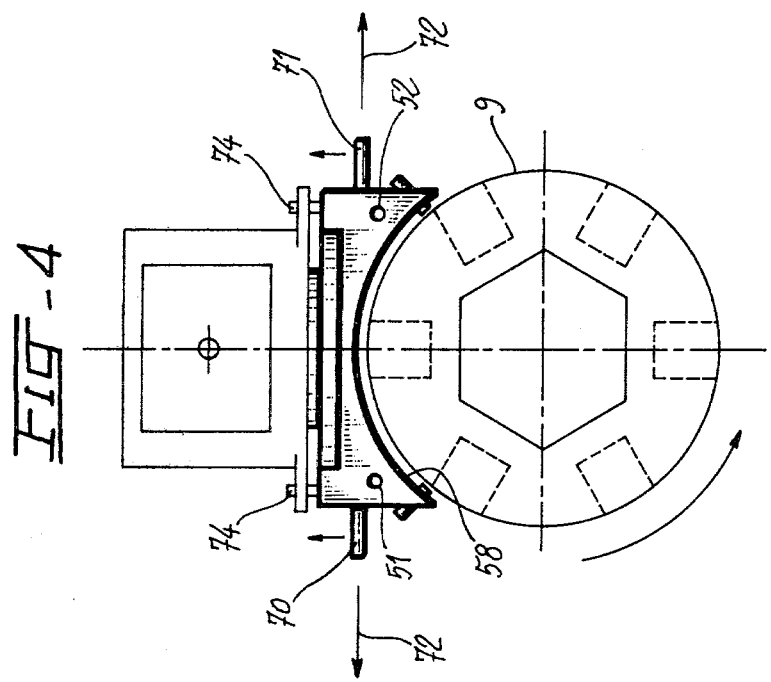
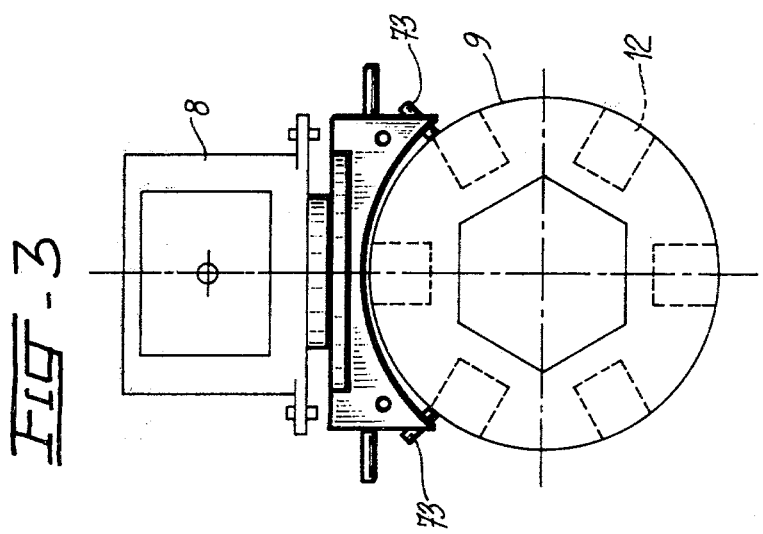

AUTOMATIC FILLING MACHINE WITH COMPRESSED-AIR SEAL

FIELD OF THE INVENTION

The present invention relates to a system for a hermetic sealing by means of compressed air between parallel surfaces of machine members capable of relative movement and, more particularly, to filling and dosing machines handling powder doses to be poured into small glass bottles or containers which are sealable in a sterilized place.

BACKGROUND OF THE INVENTION

It is known to seal surfaces of movable machine members capable of relative movement with a fully hermetic seal by providing gaskets between the moving surfaces.

Such gaskets are usually made of a material subject to wear so that in addition to costly replacement and loss of time, the gasket material can become mixed with the powder material to be handled in filling-dosing machines which pour powder doses into small glass bottles (containers) to be filled and sealed in sterilized place.

OBJECT OF THE INVENTION

It is an object of the present invention to overcome these drawbacks by eliminating the use of the traditional gaskets made of materials subject to wear and providing a faultless hermetic seal between machine members with relative movement.

SUMMARY OF THE INVENTION

A filling-dosing machine adapted to be used in sterilized place both for pouring powder doses into containers and for all sealing operations thereof comprises a powder dosing unit consisting of a main hopper, a secondary hopper operatively connected with and below said main hopper and a dosing head for the volumetric dosage of the powder is disposed rotatably below the same secondary hopper. A suction unit is formed by a high vacuum pump with a filter for the filling of the rotating-head dosing chambers and for other auxiliary services such as, for example the support of the container caps for the sealing phase of the containers and an exhaust fan with a vessel receiving the residual dust. The apparatus also comprises a unit for the production of compressed air including accessories for the necessary drying and sterilization thereof for ejecting the dosed powder and residues from the dosing chambers.

According to the invention the compressed air is used to effect a hermetic seal between the relatively movable surfaces of the secondary hopper and the dosing head rotating below the secondary hopper.

In such filling-dosing machines the powder to be poured in doses inside the containers is placed in the main hopper from which it is transferred to the secondary hopper by means of a blade stirrer. The present invention provides means for bringing its surfaces back to a proper operating relationship during the interval between subsequent surplus powder removing phases.

In the seal of the invention at least two sets of grooves are provided each consisting of at least two grooves, the two sets of grooves being transversely spaced between them by a distance equal to that of the surface zone in which the hermetic seal is desired, each groove of each set of grooves and the surface zone included between the grooves of each set of grooves being connected with the compressed air source.

BRIEF DESCRIPTION OF THE DRAWING

Further features and advantages will become more readily apparent from the following embodiment of the present invention, reference being made to the accompanying drawing wherein:

FIG. 2 is a perspective view of a detail drawn to an enlarged scale of the portion forming the hermetic seal; and FIGS. 3 and 4 show schematically a front view of this detail in two different phases using the same hermetic seal system.

SPECIFIC DESCRIPTION

Figure 1:
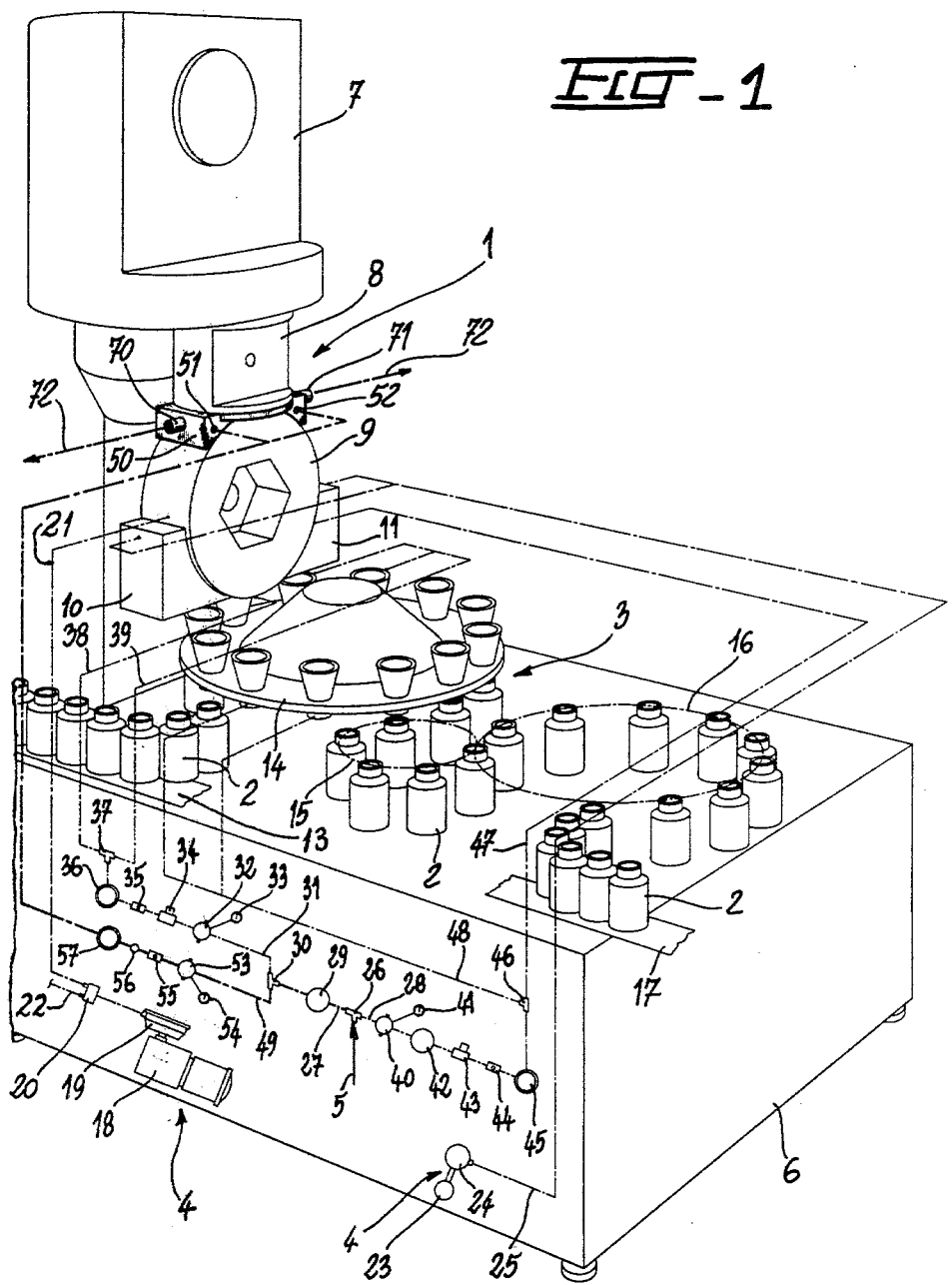
FIG. 1 is a diagrammatic perspective view of a machine embodying the hermetic seal system according to the invention.

FIG. 1 shows schematically a filling-dosing machine for pouring powder doses in small glass bottles (containers) sealable in a sterilized place. The machine comprises a powder dosing unit 1, a transport unit 3 for the group of containers 2 and pneumatic equipment for the vacuum and pressure indicated at 4 and 5, respectively.

The powder dosing unit 1 and the transport unit 3 for the containers are on a frame 6 of the machine, whereas the pneumatic equipment 4, 5 for the vacuum and pressure is located separately from the machine assembly.

The powder dosing unit 1, comprises a main hopper 7, a secondary hopper 8 arranged below the main hopper 7 and a dosing drum-shaped head 9 for the volumetric dosage of the powder to be poured in doses into the containers 2 arranged rotatably below the said secondary hopper 8 between side blocks 10 and 11 having a suction inlet.

The dosing head 9 for the volumetric dosage of the powder is provided with a plurality of dosing chambers 12 equally spaced and open at the periphery of the head 9 (see FIGS. 3 and 4).

The transport unit 3 for the containers 2, comprises from upstream to downstream sides of the path, a conventional infeed flat conveyor 13, a set of three horizontal carrying wheels 14, 15 and 16 and a discharge conveyor 17 similar to the conveyor 13.

Finally, the pneumatic equipment 4 for the vacuum comprises a high vacuum pump 18 with a filter 19 and a distributing unit 20 for the filling by suction through duct 21 of the dosing chambers 12 of the rotating dosing head 9. The suction retains the powder in each dosing chamber 12 to the discharge position. The suction means is also used for other auxiliary services, i.e. for supporting the container caps (not shown in the drawing) via duct 22, and can include an exhust fan 23 with a filter 24 and vessel for the recovery of the residual dust through duct 25 leading to the side blocks 10 and 11.

The pressure source 5 has a compressor leading to a distributing unit 26 having two ducts 27 and 28.

Duct 27 includes an oil-removing filter 29 and a distributing unit 30 connected with a duct 31 having in succession a pressure regulator 32 with manometer 33, an electric valve 34, a capacity regulator 35, a sterilizing filter 36 and a distributing unit 37 with multiple ducts of which duct 38 leads to the dosing head 9 for the discharge of the powder doses from the dosing chambers 12, and another duct 39 operates cleaning members through which the powder doses run before being poured into the individual containers 2.

Duct 28 includes in succession a pressure regulator 40 with manometer 41, an oil-removing filter 42, an electric valve 43, a capacity regulator 44, a sterilizing filter 45 and a distributing unit 46. A duct 47 leads to the dosing head 9 from distributor for the cleaning of the residual dust from the dosing chambers 12 while another duct 48 functions similarly to duct 39 with regard to other members.

A duct 49 is connected with distributing unit 30 for producing the hermetic seal by means of compressed air according to the invention, between the rotating dosing head 9 and an intermediate sector body 50 interposed between the rotating dosing head 9 and the overlying secondary hopper 8.

The duct 49 is connected at 51 and 52 with the intermediate sector body 50 and has in succession a pressure regulator 53 with manometer 54, a capacity regulator 55, a pressure switch 56 and a sterilizing filter 57.

The intermediate sector 50 is elastically movably connected with the secondary hopper 8 in a known way and hence not described in detail and has (see FIG. 2) an arched surface 58 extending parallel or coaxially (see in detail FIG. 4) with the peripheral cylindrical surface of the dosing head 9. The intermediate sector body 50 is also provided with an opening 59 communicating with the discharge hole of secondary hopper 8 and on said arched surface 58, along bands arranged on either side of the opening 59 with two sets 60 and 61 of grooves. Each set consists of two grooves indicated at 62 and 63, respectively. The pairs of grooves 62 and 63 extend on the arched surface 58 from one end to the other thereof close to four intermediate sector body 50 apexes. Between the pairs of grooves 62 and 63 of the two sets of grooves 60 and 61, near the apexes corresponding cavities are provided at 64 and 65. Near the terminal part and on the bottom of said pairs of grooves 62 and 63 as well as on the bottom of aforesaid 64 and 65 holes are provided as indicated by 66, 67, 68, 69, respectively.

The pairs of holes 66, 67, and the holes 68, 69, of each end are provided so as to be connected between within the intermediate sector body 50. To such holes 68, 69 the duct 49 leads at 51 and 52 whereas the pairs of holes 66, 67 are connected at 70 and 71, respectively, with discharged ducts 72. At each of the four apexes of said intermediate sector body 50 a respective pin 73 is provided whose function will be described hereinafter.

When the dosing machine is inoperative by effect of the elastic connection between the intermediate sector body 50 and the secondary hopper 8, said intermediate sector body 50 is arranged as shown in FIG. 3 with pins 73 in contact with the peripheral cylindrical surface of the dosing head 9, whereas when the dosing machine is being operated, compressed air is let in through duct 49 and holes 68, 69 in the surface zone 58 of said intermediate sector body 50 comprised between the pairs of grooves 62 and 63 so that, still by effect of the aforesaid elastic connection between the intermediate sector body 50 is moved upwards bringing its arched surface 58 into the position shown in FIG. 4.

In that way in the arched surface zones 58 comprised between pairs of grooves 62 and 63, respectively an air compressed hermetic seal is created, for the powder discharging opening 59 and the underlying dosing chambers 12 of the rotating volumetric-dosing head 9. Since, as aforementioned, at the time of removing the surplus protruding powder from inside the dosing chambers 12 of the rotating dosing head, owing to the movement of this latter as regards to the intermediate sector body 50 elastically movably connected to the secondary hopper 8 cause said intermediate sector body 50 to fluctuate as regards to the dosing head 9, the pins 73 contacting the peripheral cylindrical surface of said dosing head 9 also with the aid of the adjustable locator pins 74 bring the precited intermediate sector body 50 back to the proper operating relation as regards to said dosing head 9 in the interval between subsequent surplus powder removing phases.

With this hermetic seal it has been possible to fully eliminate any type of gasket, made of material subject to early wear, fitted between the moving parts mostly in contact with the powder handled on said filling dosing machines operating in sterilized place and this gave raise to a much greater interest in using the aforesaid machines.

In point of fact it is worth mentioning that with the compressed-air hermetic seal it has been possible to eliminate not only the friction between the parts in working relationship with relative movement and the consequent residual dust due to the wear of the surfaces in contact, but also to obtain a continuous self-lubrication among said moving parts owing to the unterrupted air flowing to the surface zones 58 comprised between the pairs of grooves 62 and 63 coming from holes 68 and 69 and going out through holes 66 and 67.

We claim:

1. A filling machine for metering predetermined quantities of a powder into a succession of containers, comprising:

a main hopper receiving said powder;

a secondary hopper disposed below said main hopper and receiving the powder therefrom;

a rotary head spaced below said secondary hopper and provided with a plurality of chambers each adapted to be filled with powder for discharging said powder successively into said containers;

transport means for successively positioning said containers below said head for receiving metered quantities of powder from said chambers;

an intermediate body disposed between said secondary hopper and said head, said intermediate body having an arcuate surface confronting an arcuate surface of said head and an opening at the arcuate surface of said body communicating between said secondary hopper and chambers of said head aligned with said opening, said surface of said body being provided with two pairs of parallel grooves flanking said opening and open toward the surface of said head, with recesses between the grooves of each pair and with ports opening in said grooves; and a source of compressed air communicating with said recesses whereby a hermetic seal is formed by the compressed air between said surfaces around said opening with compressed air being discharged through said ports.

2. The machine defined in claim 1 wherein said body is yieldably connected with said secondary hopper and is capable of movement vertically toward and away from said head, said body being provided with pins spacing said surfaces apart in the absence of the feed of compressed air to said recesses.

3. The machine defined in claim 2 wherein said pins project generally radially from said body.

4. The machine defined in claim 1 wherein said recesses are provided at the ends of said grooves.

* * * * *